of the page:

United States Patent [19]

Curtis

[11] Patent Number: 5,227,095
[45] Date of Patent: Jul. 13, 1993

[54] MODULAR COOLING TOWER

[76] Inventor: Harold D. Curtis, Rte. 2, Box 139, Chickasha, Okla. 73018

[21] Appl. No.: 976,195

[22] Filed: Nov. 13, 1992

Related U.S. Application Data

[63] Continuation of Ser. No. 799,410, Nov. 27, 1991.

[51] Int. Cl.$^5$ .............................................. B01F 3/04
[52] U.S. Cl. ............................ 261/30; 261/DIG. 11; 261/DIG. 85; 261/111; 261/89; 261/112.2
[58] Field of Search ............... 261/30, DIG. 11, 89, 261/111, DIG. 85, 112.2

[56] References Cited

U.S. PATENT DOCUMENTS

| | | | |
|---|---|---|---|
| 2,250,978 | 7/1941 | Weiland et al. | 62/140 |
| 2,445,908 | 7/1948 | De Flon et al. | 261/DIG. 11 |
| 3,253,819 | 5/1966 | Talbot | 261/89 |
| 3,363,885 | 1/1968 | Meek | 261/112.2 |
| 3,384,165 | 5/1968 | Mathews | 261/DIG. 11 |
| 4,267,130 | 5/1981 | Curtis | 261/DIG. 11 |
| 4,416,836 | 11/1983 | Sinek | 261/112.2 |
| 4,521,350 | 6/1985 | Letevre | 261/111 |
| 4,637,903 | 1/1987 | Bardo et al. | 261/111 |

FOREIGN PATENT DOCUMENTS

| | | | |
|---|---|---|---|
| 1451155 | 2/1969 | Fed. Rep. of Germany | 261/DIG. 11 |
| 1158377 | 1/1958 | France | 261/DIG. 11 |
| 52-26645 | 2/1977 | Japan | 261/DIG. 11 |
| 57-142483 | 9/1982 | Japan | 261/DIG. 11 |

Primary Examiner—Tim Miles
Attorney, Agent, or Firm—Dougherty, Hessin, Beavers & Gilbert

[57] ABSTRACT

A direct forced draft counterflow water cooling tower module includes an integral one-piece frame and basin preferably constructed from molded fiberglass. The cooling tower includes a liquid distribution system, fill material located below the liquid distribution system, a drainage collection system located below the fill material, and at least one fan located below the drainage collection system. The fan blows cooling air directly upward through the drainage collection system and then through the fill material.

19 Claims, 5 Drawing Sheets

MODULAR COOLING TOWER

This is a continuation of copending application Ser. No. 07/799,410 filed on Nov. 27, 1991.

BACKGROUND OF THE INVENTION

1. Field Of The Invention

The present invention relates generally to cooling tower apparatus, and more particularly, but not by way of limitation, to industrial water cooling towers.

2. Description Of The Prior Art

One common type of industrial cooling tower is a counterflow tower wherein water falls downward through a fill layer while cooling air moves upward through the fill material. The term "counterflow" refers to the fact that the warm water and cool air are moving in opposite directions.

Counterflow cooling towers may be of three types, namely induced draft, natural draft, and forced draft.

An induced draft counterflow cooling tower has a fan located on top of the tower which sucks air up through the fill material. Air flows laterally along the ground surface adjacent the tower and once it is under the tower it turns ninety degrees and flows upward through the fill material, with this flow being induced by the fans on top of the tower which suck the air up through the tower. Examples of induced draft counterflow cooling towers are seen in U.S. Pat. Nos. 4,267,130 and 4,301,097, both to Curtis. U.S. Pat. No. 4,521,350 to Lefevre, shows at FIG. 1 thereof a natural draft counterflow cooling tower. A natural draft cooling tower does not utilize a fan to assist the air flow, but instead relies upon the natural tendency of warmer air to flow upward. The natural draft cooling tower shown in U.S. Pat. No. 4,521,350 is the type commonly referred to as a hyperbolic natural draft cooling tower. The Lefevre patent shows the use of a drainage collection system below the fill material in the natural draft counterflow cooling tower thereshown.

U.S. Pat. Nos. 2,606,750 and 2,915,302 to Jacir show forced draft counterflow water cooling towers. Forced draft towers have a fan located on the side of the tower which blows air into a plenum chamber on the lower side of the tower. A plurality of vanes are used to turn the air ninety degrees to direct it upward through the tower. The Jacir apparatus utilizes a drainage collection system located below the fill. As used in the trade, the term "forced draft" is understood to refer to a system like that of Jacir having a fan on the side of the tower blowing into a lower plenum so that the air must then turn ninety degrees to flow upward through the tower.

A second common type of cooling tower is a cross flow tower. Cross flow cooling towers have the warm water falling downward through fill material while cooling air is drawn in horizontally at approximately ninety degrees to the path of the falling water. These cross flow cooling towers are typically induced draft towers which have a plenum chamber and fan located on top of the tower sucking the air up through the tower.

The prior art also includes a cross flow cooling tower having a fan located below the tower for forcing air upward into a central plenum chamber so that the air then turns ninety degrees and flows horizontally out through the fill material which is located around the perimeter of the tower. Such a system has been marketed by the Marley Cooling Tower Company. In that system, there is no fill material located directly above the fan, but rather the fill material is all located around the perimeter of the fan, with the area directly above the fan defining a plenum chamber into which the fan blows.

The prior art also includes many versions of drainage collection systems made up of a series of overlapping sloped collection plates with troughs along their lower edge. Such systems are shown for example in the Jacir and Lafevre patents cited above.

Industrial cooling towers typically are very large structures having lateral dimensions on the order of twenty to one hundred feet and having a height on the order of twenty to thirty feet. Such structures are built at the field site. Typical delay between the time of order and the time of completion of an industrial cooling tower is on the order of one year. The construction of such a tower is a major undertaking.

Although relatively small towers have been built which could be transported to the field site, for example some rooftop towers used for the mechanical systems of office buildings and the like, there has never been a successful modular cooling tower system whereby individual modules of a size that can be readily transported are prefabricated in a factory, and then easily assembled at a field site to provide the large capacity demanded by many industrial water cooling projects.

SUMMARY OF THE INVENTION

The present invention provides a modular construction cooling tower made up of a plurality of individual modules. This is made possible by constructing each individual module as a direct forced draft counterflow water cooling tower. Each individual module is capable of independent operation. The desired number of modules can be assembled at the field site to provide any needed cooling capacity.

The modules can be prefabricated and warehoused and then delivered substantially immediately upon demand. The cooling tower module of the present invention is believed to be the first direct forced draft counterflow water cooling tower ever provided. By "direct forced draft" it is meant that the fans are located under the fill media and pointed upward so that air blown by the fan moves directly upward from the fan's blades through the cooling tower. This is contrasted to a side-mounted forced draft counterflow system where the air comes in under the tower horizontally and then must turn through ninety degrees to move up through the cooling tower.

Such a direct forced draft counterflow water cooling tower in a dimensional package capable of transport over the highways without oversized permits has been possible by two developments. One is the development of a low profile liquid distribution system and the other is the development of a drainage collection system which operates in conjunction with fans located immediately therebelow to direct condensation and overspray to a collection basin.

Each cooling tower module includes a liquid distribution system, fill material located below the liquid distribution system, a drainage collection system located below the fill material, and at least one fan located below the drainage collection system.

Methods of cooling liquids and methods of constructing modular cooling towers are also disclosed.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
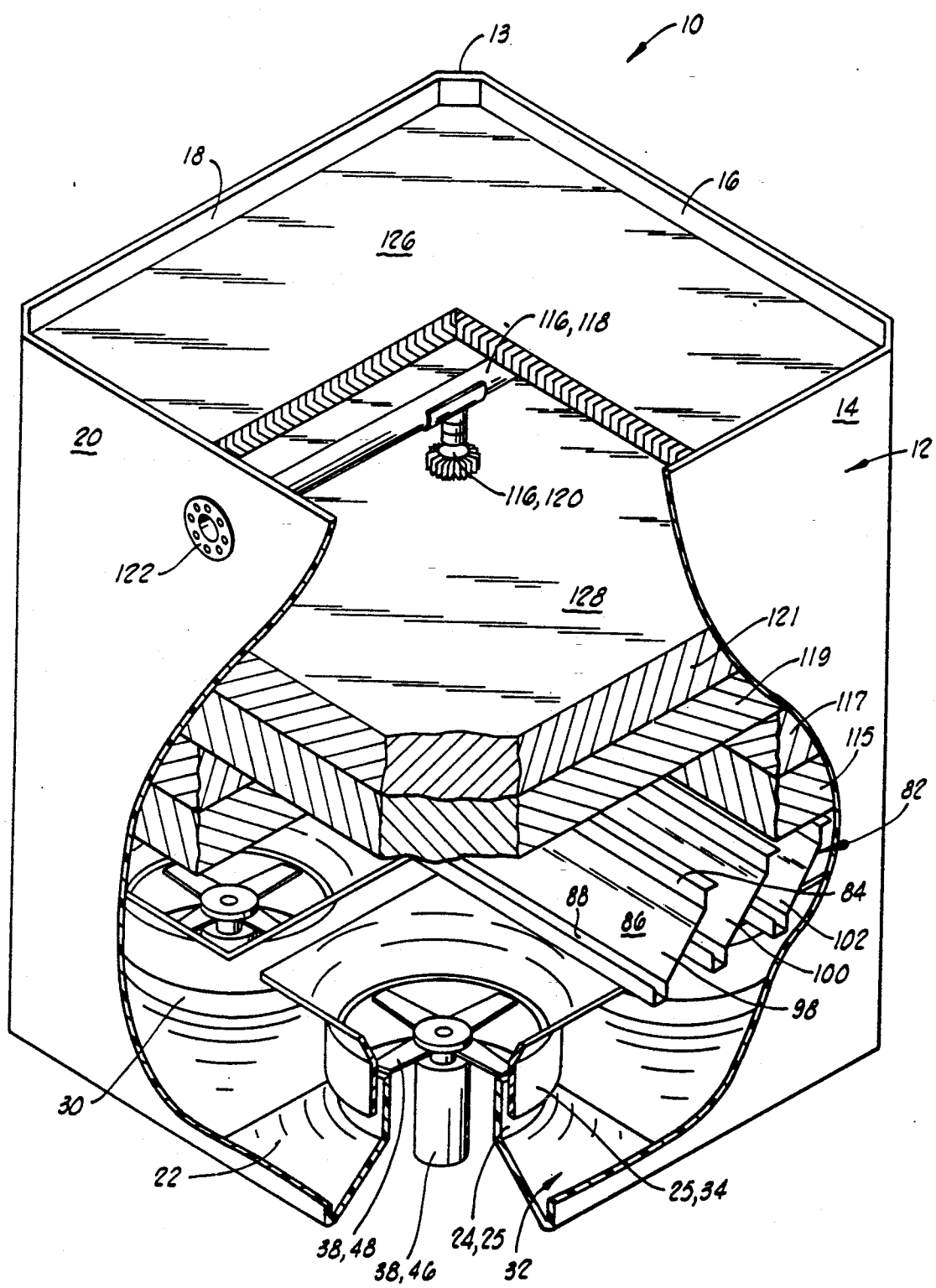
FIG. 1 is a perspective cutaway view of a direct forced draft counterflow water cooling tower module.

FIG. 1 shows a perspective cutaway view of a direct forced draft counterflow water cooling tower module designated by the numeral 10. By "direct forced draft" it is meant that the fans are located below the fill media and pointed upwards so that air blown by the fan moves directly upward from the fan's blades through the cooling tower.

Figure 4:
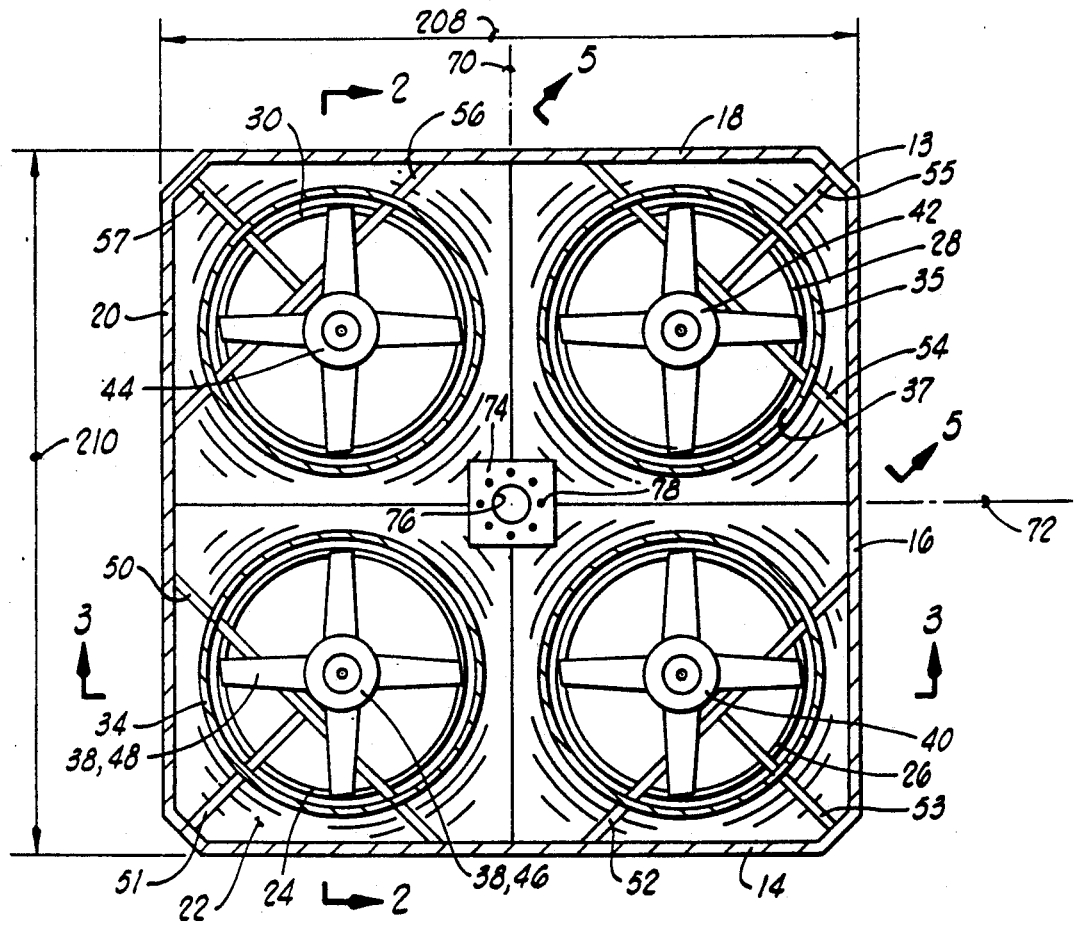
FIG. 4 is a plan view taken along line 4—4 of FIG. 3 showing the plan of the side walls and basin structure with reinforcing gussets in place therein and with fans mounted on the reinforcing gussets.

The cooling tower 10 includes an integrally constructed generally rectangular parallelepiped shaped frame 12 having first, second, third and fourth sides 14, 16, 18 and 20 and having a bottom 22 which is each quadrant flares upward to define first, second, third and fourth fan inlet ducts 24, 26 28 and 30, respectively. Reinforcing ribs (not shown) may be molded into the walls 14, 16, 18 and 20. The sides 14, 16, 18 and 20 define a generally rectangular plan shape as seen in FIG. 4. The frame 12 preferably has beveled corners 13 which have about a four-inch width.

The frame 12 is shown as a single fiberglass, i.e., fiber reinforced plastic, member which has been molded at one time as a single piece. The frame 12 may also be constructed by joining two or more separately molded fiberglass pieces. If multiple separate molded pieces are used, it is preferable that they be assembled in such a way as to result in an integral unitized waterproof frame 12 that provides the structural integrity necessary to support all of the internal components and water load of the cooling tower module 10 without the need for structural supports other than reinforcing gussets like the gussets 50–57 discussed above.

If the frame 12 is assembled from separately molded pieces, that can be done in several ways.

For example, a basin portion of frame 12 extending up to about the bottom edge 108 of the collecting plates 90–106 may be separately molded. It is preferable to have no seams in the basin portion in order to avoid water leakage. The upper box portion of the frame 12 can then be formed in several ways. It can be a second four walled piece with a lower edge constructed to fit within an upper edge of the basin portion in an overlapping tongue and groove manner; the overlapping joint would then be glassed for structural integrity and to prevent leakage. An alternate construction for the upper box portion is to make it from two identical halves which join along vertical seams at diagonally opposite corners as seen in plan view; the lower edge of the upper box assembly could then interlock with the basin in a tongue and groove fashion as previously described. A third alternative is to construct a four walled member that extends the entire height of frame 12 and completely surrounds the lower basin unit, with an appropriate structural interconnection being provided therebetween; for example, the outer box portion could have an internal ledge molded therein which would fit over the upper edge of the basin portion with the two being subsequently bolted and/or glassed together. This third alternative provides a superior aesthetic appeal since it avoids visible external seams.

Figure 8:
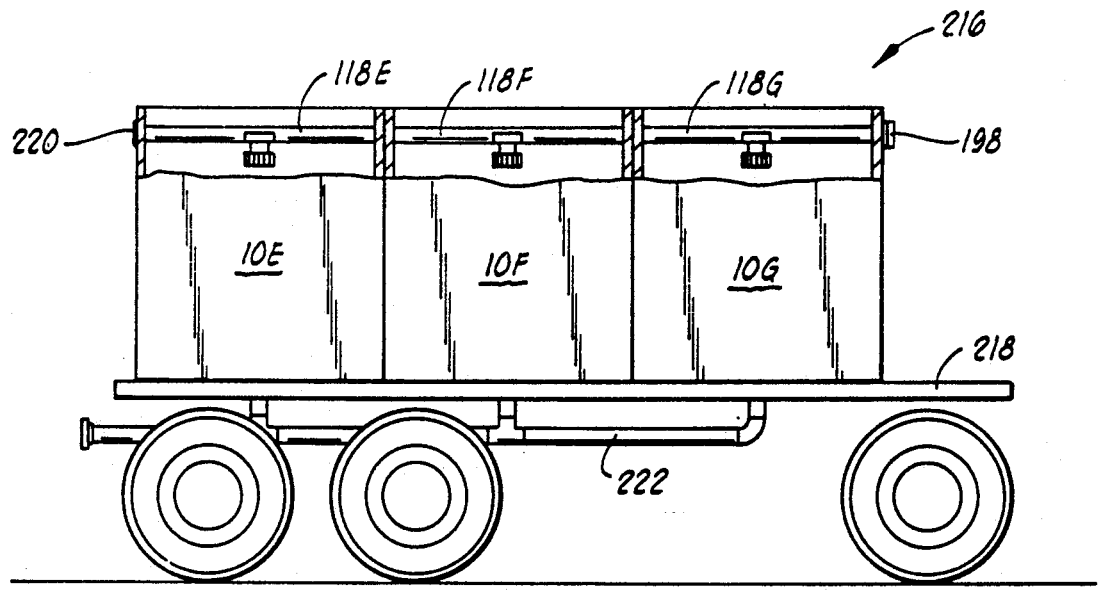
FIG. 8 illustrates another version of modular cooling tower including three of the modules of FIG. 1 assembled together on a trailer frame.

The frame 12 is a transportable frame which makes the module 10 easily transportable on a flat bed truck or the like such as shown in FIG. 8.

Defined within the walls 14, 16, 18 and 20 and laterally surrounding the inlet ducts 24, 26, 28 and 30 is an irregular shaped basin 32 which can be described as being integrally constructed with and supported by the frame 12.

The fan inlet duct 24 can generally be described as a lower cylindrical duct portion of an air supply duct 25. The air supply duct 25 further includes an upper cylindrical portion 34 which may also be referred to as a fan shroud 34.

The fan inlet duct 24 is telescopingly received within the fan shroud 34 with an annular gap 36 (see FIG. 2) defined between overlapping portions thereof. The annular gap 36 is communicated with the basin 32 and provides part of a secondary liquid collection means for collecting condensate and overspray as is further described below.

As best seen in FIG. 1, each of the fan shrouds such as 34 flares out into a square shape, the edges of which do not contact any of the surrounding structure, thus leaving openings surrounding each fan shroud and within the walls of frame 12 so that liquid falling through the tower may be directed through those openings into the basin 32 as further described below.

Mounted within each of the fan inlet ducts 24, 26, 28 and 30 are first, second, third and fourth fan assemblies 38, 40, 42 and 44. Each fan assembly includes an electric motor and a fan rotor. For example, the fan assembly 38 has electric motor 46 and fan rotor 48.

The fans are preferably direct drive fans as illustrated. It will be understood, however, that a single large fan in a single central fan inlet duct could replace the four smaller fans illustrated. If a single larger fan is used, it may be necessary for it to use an intermediate speed reducing drive member such as a gear box or a drive belt and pulley arrangement.

Figure 5:
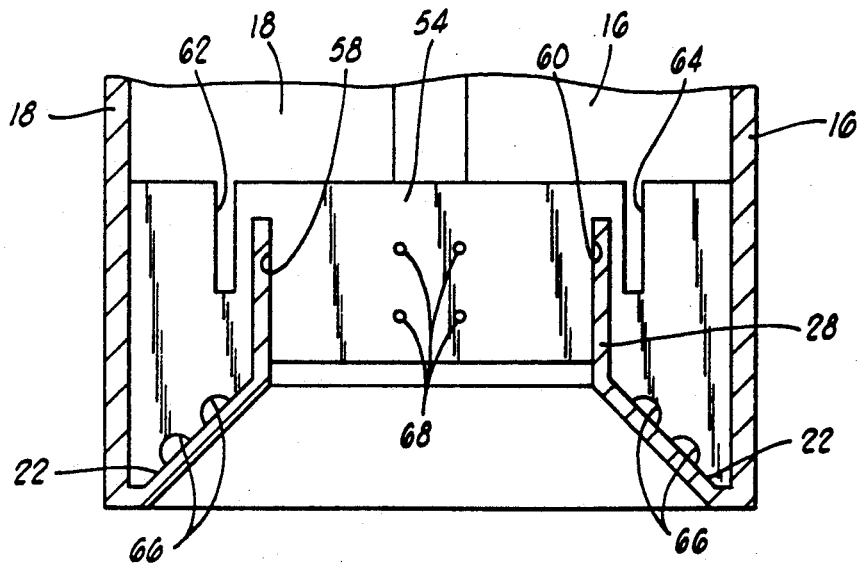
FIG. 5 is an elevation sectioned view taken along line 5—5 of FIG. 4 showing in profile one of the reinforcing gussets/mounting plates.

The mounting of the fans is best shown in FIGS. 4 and 5. FIG. 4 is a plan sectioned view taken approximately along line 4—4 of FIG. 2.

First, second, third and fourth reinforcing/fan mounting gussets 50, 52, 54 and 56 are placed within the frame 12. Each gusset is a vertically oriented plate-like member. A profile view of third gusset 54 is shown in FIG. 5.

Each of the gussets such as gusset 54 is cut from a flat piece of fiberglass material. The gusset 54 spans in a cord-like fashion across fan inlet duct 28 and terminates against the inside of walls 16 and 18. The profile of gusset 54 is cut so that it engages the bottom 22 as it spans between the side walls 16, 18 and the air supply duct 28. Notches 58 and 60 are cut to closely fit over the fan inlet duct 28. Additional notches 62 and 64 are cut to receive the fan shroud 35 which is shaped like fan shroud 34 seen in FIG. 1. It is noted that in FIG. 5 the fan shroud 35 is not shown.

A plurality of openings such as 66 are formed through gusset 54 along the bottom 22 so that water in all portions of the basin 32 can communicate throughout the basin 32.

When the gusset 54 is located as shown in FIG. 5, it is glassed into place thus forming a strong fiberglass joint between the gusset plate 54 and the side walls 16 and 18, the bottom 22, and the air supply duct 28.

Corner brace gussets 51, 53, 55 and 57 are similarly constructed and extend from the gusset plates 50, 52, 54 and 56, respectively, to their associated corners of frame 12.

The gusset plate 54 has a pattern of bolt holes 68 formed therein for mounting of the motor of fan assembly 42.

The fan shroud 35 is mounted by lowering it into the notches 62 and 64 and additionally providing a plurality of bolts (not shown) around the perimeter of the fan shroud with appropriate spacers (not shown) so that the fan shroud 35 is bolted to the air inlet duct 28 with the spacers maintaining a gap 37 between the fan shroud 35 and the air supply duct 28. After the fan shroud is set and bolted in place, it also is glassed to the gusset 54 around notches 62 and 64.

Thus, the gusset 54 performs two important functions. First it provides a structural brace for the frame 12. Second, it provides a means for mounting of the motor of fan assembly 42.

Though not illustrated, additional reinforcing gussets can be added if needed. It is anticipated that it will be preferable to also have gussets spanning from opposite walls of frame 12 along the center lines thereof like center likes 70 and 72 indicated on FIG. 4.

As is also best seen in FIG. 4, there is defined along the bottom 22 of frame 12 in the center thereof a rectangular-shaped flat portion 74 having a basin outlet opening 76 defined therethrough. A pattern of bolt holes 78 provide an easy means for bolting a bolted flange of a basin discharge piping 80 (see FIG. 7) thereto.

Each of the fans is a direct drive fan having its fan rotor 48 directly mounted on the shaft of the motor 46 without any gear box therebetween. This eliminates many of the mechanical problems commonly encountered in large cooling tower fans which have gear boxes between the fan motor and the fan rotor as is necessary for large fan rotors.

Located above the fan shrouds is a drainage collection system 82 made up of a plurality of collection plates.

Figures 2, 3:
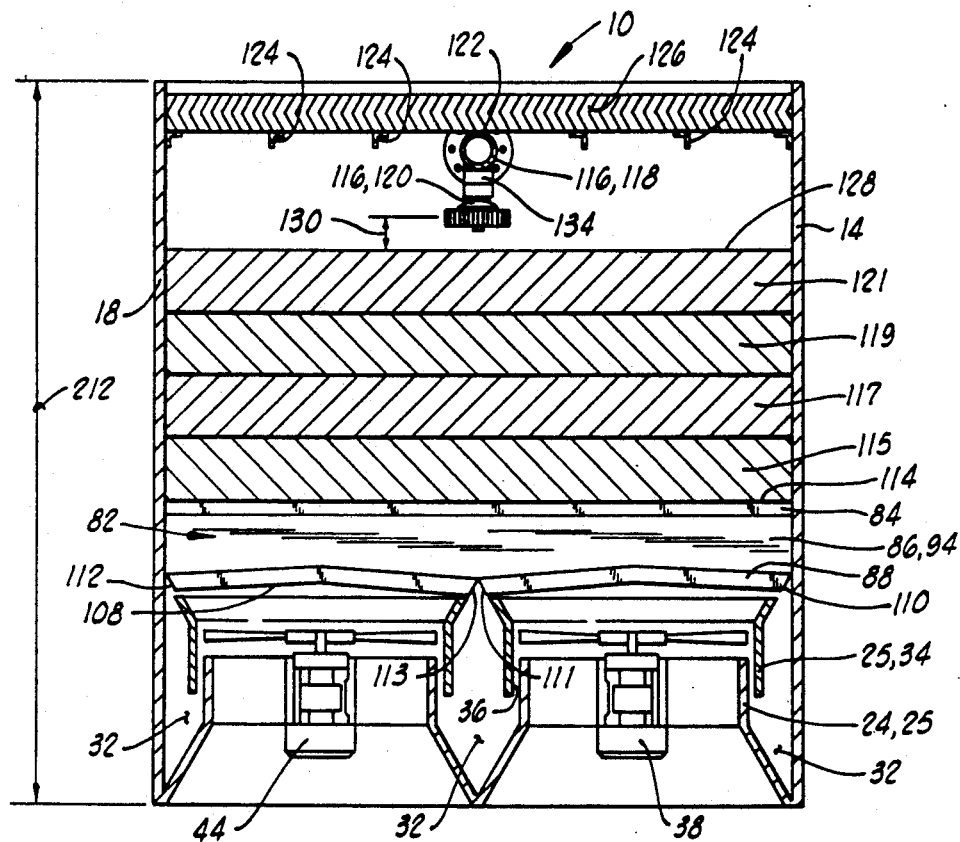
FIG. 2 is an elevation cross-section view of the module of FIG. 1 taken along line 2—2 shown in the plan view of FIG. 4.
FIG. 3 is an elevation cross-section view of the module of FIG. 1 taken along line 3—3 shown in the plan view of FIG. 4.

As best seen in FIG. 3, the drainage collection system 82 includes nine drainage collection plates 90, 92, 94, 96, 98, 100, 102, 104, 106. The fifth, sixth and seventh collection plates 98, 100 and 102 are shown in the cutaway view of FIG. 1. A profile of the third collection plate 94 is seen in FIG. 2.

Each of the collection plates spans between walls 14 and 18 of frame 12. The ends of each collection plate are preferably connected to the walls 14 and 18 by clips (not shown) which are glassed into or molded into the walls 14 and 18. The collection plates are preferably constructed from fiberglass.

As best seen in FIG. 1, each of the collection plates such as plate 98 includes an upper structural angle shaped portion 84, an intermediate planar collecting surface portion 86, and a lower gutter portion 88.

As best seen in FIG. 3, the upper portion 94 of each collecting plate overlaps the lower gutter portion 88 of the adjacent collecting plate so that all liquid falling down through the cooling tower 10 will fall upon one of the collecting plates 90, 92, 94, 96, 98, 100, 102, 104 and 106.

The liquid which falls downward through the cooling tower 10 is collected on the collection plates 90, 92, 94, 96, 98, 100, 102, 104 and 106. More particularly, the liquid for the most part falls upon the intermediate portions 86 and runs down into the gutter portions 88.

As seen in FIG. 2, the gutter portion 88 has a lower edge 108 which has two peaks at quarter-points between the walls 14 and 18 and has a low point midway between walls 14 and 18. The lower edge 108 slopes downward in each direction from the peaks. The purpose of this slope is to aid in the flow of liquid through the gutter 88 laterally toward the walls 14 and 18 and toward the center of the span. The gutter portion 88 terminates at lateral ends 110 and 112 which overlie open top portions of basin 32 and stop short of walls 14 and 18 so that the liquid in gutter portions 88 can run freely into the basin 32. The gutter portion 88 also has central outlets 111 and 113 which spill into basin 32.

The upper structural portions 84 of collection plates 90, 92, 94, 96, 98, 100, 102, 104 and 106 have a straight horizontal upper edge 114 (see FIG. 2). Supported directly upon the straight upper edges 114 are first, second, third and fourth layers of fill material 115, 117, 119 and 121, respectively. The fill material is a commercially available corrugated plastic fill material which preferably is provided in strips one foot wide by one foot thick having a width such that each strip will snugly fit across the frame 12 and snugly engage opposed side walls such as side walls 14 and 18.

Located above the upper layer 121 of fill material is a liquid distribution system 116 which includes a distribution pipe 118 and one and only one spray nozzle 120. The pipe 118 is a fiberglass pipe which spans between and is supported by opposed side walls 16 and 18. The pipe 118 is glassed into the walls 16 and 18 so that the pipe 118 and walls 16 and 18 form an integrally constructed fiber reinforced plastic structure. Portions of the walls 16 and 20 immediately surrounding the ends of pipe 118 have a bolt pattern formed therein to define a bolted flange such as 122 (see FIG. 1) which is substantially flush with the outer surface of the walls 16 and 20. The area forming the bolted flange may, if necessary, be a thickened area of the walls 16 and 20.

It is noted that the pipe 118 lies at an angle of ninety degrees to the direction in which the collector plates 90–106 run. Thus, the collector plates 90–106 serve to resist inward buckling of side walls 14 and 18, Whereas the pipe 118 serves to resist inward buckling of side walls 16 and 20. Further, the snug packing of the four layers 115, 117, 119 and 121 of fill material further provide rigidity to the side walls to resist inward buckling thereof.

As seen in FIG. 2, the pipe 118 has an upper edge 122, and there are a plurality of angle-shaped structural supports such as 124 spanning walls 16 and 20 parallel to pipe 118 and having their uppermost surfaces at the same elevation as upper edge 122 of pipe 118. The edge 122 and the supports 124 provide a support grid for a layer of drift eliminators 126. The drift eliminators 126 are a commercially available material which minimize the mist which leaves with air flowing upward out the cooling tower 10 in a well-known manner.

The drift eliminators 126 will, as understood by those skilled in the art, have a directional orientation and they can be oriented to provide the most advantageous exiting direction of air flowing out of the module 10 so as to minimize recirculation thereof.

The fans blow air directly upward therefrom through the drainage collection system 82 and then through the layers of fill material 115, 117, 119 and 121 in counterflow to the water circulating down through the fill material. The air exhausts upward through the drift eliminators 126 which knock out much of the mist carried by the air in a known manner.

The nozzle 120 is a low profile nozzle means 120 for creating a spray pattern covering substantially the entire plan area of the upper surface 128 of upper layer 121 of fill material with a free-fall height 130 (see FIG. 2) from the spray outlet of nozzle 120 to the top 128 of upper fill layer 122 of less than one foot.

Figure 9:
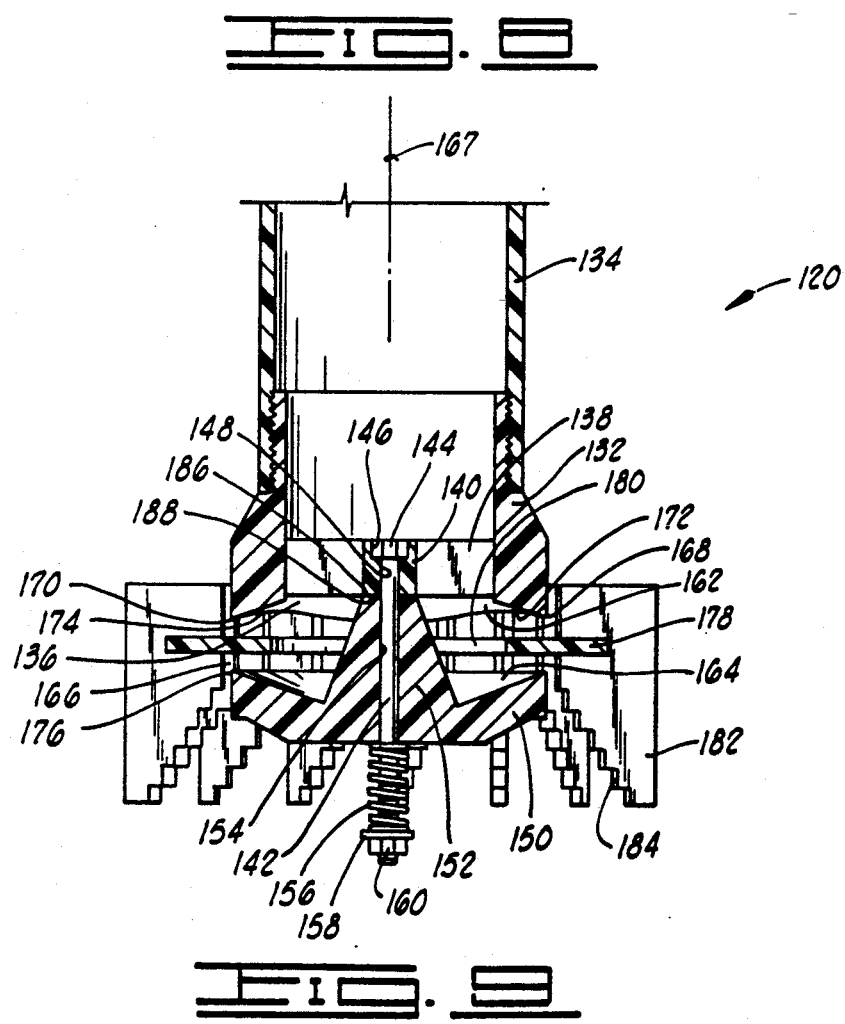
FIG. 9 is an elevation cross-section view of the low profile water distribution nozzle utilized with the cooling tower of FIG. 1.

The details of construction of nozzle 120 are best shown in the enlarged elevation sectioned view of FIG. 9. Further details of the construction of nozzle 120 and of other forms of low profile nozzles capable of providing large spray patterns with a minimal spray free-fall height are shown in my co-pending applications, Ser. No. 07/714,848, now U.S. Pat. No. 5,143,657 for FLUID DISTRIBUTOR, filed Jun. 13, 1991, and Ser. No. 07/792,978, now U.S. Pat. No. 5,152,148 for AUTOMATICALLY ADJUSTABLE FLUID DISTRIBUTOR filed Nov. 15, 1991, the details of which are incorporated herein by reference.

The nozzle 120 includes a supply header 132 connected to a vertical pipe header 134 which extends downward from horizontal pipe 118. A downwardly facing fluid outlet 136 is defined in supply header 132.

A spider 138 is integrally molded with supply header 132 and has a central hub 140.

A downwardly extending support rod or bolt 142 has a hex head 144 at its upper end which is received in a hex socket 146 molded in hub 140. Bolt 142 extends downward through bore 148 of hub 140.

A limit structure 150 which can also be referred to as a deflector plate 150 has a hub 152 with a central bore 154 which slidably receives the support rod 142 therein.

A coil compression mechanical spring 156 is disposed about support rod 142 on a side of the deflector plate 150 opposite the fluid outlet 136. It is held in place by a washer 158 and nut 160.

The supply header 132 has an irregular-shaped first annular surface 162 defined thereon. The limit structure or deflector plate 150 has a second annular surface 164 defined thereon. The first and second annular surfaces 162 and 164 are spaced apart to define an annular nozzle opening 166 therebetween.

The first annular surface 162 is an irregular-shaped surface so that a vertical spacing between the first and second annular surfaces 162 and 164 varies around a circumference of said annular nozzle opening 166 to create a non-circular spray pattern in fluid exiting the nozzle opening 166.

The irregular-shaped first annular surface 162 is an undulating surface having four peaks equally spaced at ninety degree intervals about the circumference of annular surface 162, and having four troughs located between said peaks and also being substantially equally spaced. One of the troughs is located equidistant between each adjacent pair of peaks. In FIG. 9, two opposed peaks, neither of which is directly visible, are oriented on a center line 167 of supply header 132. Two other peaks 168 and 170 lie on the right and left edges of the profile seen in FIG. 9. Two of the troughs are visible and are identified as 172 and 174.

As is visible in FIG. 9, the irregular-shaped first annular surface 162 also is inwardly and upwardly tapered toward the fluid outlet 136.

The undulations formed by the peaks and troughs of irregular surface 162 are of uniform height, so that the annular nozzle opening 166 has four widest spots located between the troughs and the second annular surface 164, and four narrowest spots located between the peaks and second annular surface 164. Thus, a generally square spray pattern will be provided since substantially more fluid will flow through the more open portions of the annular opening 166. Thus, when using a single nozzle apparatus 120 over a square fill area like the upper surface 128 of upper layer fill 121, the troughs will be oriented toward the corners of the square.

The second annular surface 164 is a uniform frustoconically shaped surface and can be described as having a radially outermost edge 176 which will lie substantially in a plane. It will be understood, however, that if desired both of the annular surfaces 162 and 164 could be irregular-shaped surfaces so as to contribute to the variance in spacing therebetween. With the preferred embodiment illustrated, however, the spacing between the first and second annular surfaces 162 and 164 will be substantially equal at each of the troughs and at each of the peaks in the first surface 162.

A rotating slinger plate or flow divider plate 178 is located between the first and second annular surfaces 162 and 164. A circular central opening 180 is defined through divider plate 178. The divider plate 178 is illustrated in FIG. 9 in a "floating" position as it would be during normal operation.

A plurality of impeller blades 182 are attached to the plate 178 around the annular nozzle opening 166. Each of the blades 182 extends radially outwardly beyond an outer edge of the plate 178. Each of the blades 182 also extends both above and below the plate 178 to intercept fluid flowing outward both over and under plate 178.

Each of the impeller blades 182 includes a radially inner serrated edge 184 for atomizing the fluid exiting the annular nozzle opening 166. Further, the significant extent to which the impeller blades 184 extend below plate 178 in conjunction with the serrated edge 184 provides a means for deflecting some of the fluid exiting the annular nozzle opening 166 below the plate 178 back radially inward toward the longitudinal axis 167 of the annular nozzle opening 166 to eliminate a central void in the spray pattern below the nozzle opening 166 and particularly below the deflector plate 150.

As water flows downward through conduit 134 it splits into two annular streams, one being an upper stream flowing between plate 178 and upper annular surface 162, and the other being a lower stream flowing between plate 178 and lower annular surface 164. The exiting water hits impeller blades 182 causing the plate 178 and impeller blades 182 to rapidly spin. The plate 178 floats on a water bearing defined by the two annular streams of fluid flowing above and below the plate 178. The rotating impeller blades 182 break up the flow of the annular stream causing a very uniformly distributed spray pattern over the entire area of the upper surface 128 of upper layer 121 of fill material.

Returning now to the slidable mounting of the deflector plate 150 upon support rod 142, that slidable mounting in combination with the compression spring 156 provides an automatic adjusting means for increasing the spacing between the first and second annular surfaces 162 and 164 in response to an increase in fluid pressure in the annular nozzle opening 166.

The nozzle 120 is initially assembled with an axially inner upper end 186 of deflector hub 152 held in abutting engagement with an axially outer or lower end 188 of spider hub 140. This is accomplished by running nut 160 up on threaded bolt 142 to compress spring 156 until spring 156 holds deflector hub 152 against spider hub 140. It will be appreciated that when the fluid pressure supplied to the nozzle 120 is increased, that increased fluid pressure will create an increased downward force acting on deflector plate 150 which will cause the compression spring 156 to be compressed thus increasing the spacing between annular surfaces 162 and 164. The spring 156 can be generally described as a resilient biasing means 156 for resiliently opposing sliding motion of the deflector plate 150 downward away from the supply header 132. The spring rate of spring 156 can be adjusted by increasing or decreasing the initial compression applied by nut 160.

The deflector plate 150 is shown in FIG. 9 in an initial position wherein a minimum spacing between the annular surfaces 162 and 164 is defined by the physical dimensions of deflector plate 150 and supply header 132. When fluid pressure supplied to the nozzle 120 is increased, the increased downward force acting on deflector plate 150 will compress spring 156 to increase the spacing between annular surfaces 162 and 164.

In a typical example, the nozzle 120 will be designed with an initial minimum clearance between surfaces 162 and 164 at the peaks of surface 162 of about one-half inch. The divider plate 178 will have a thickness of about one-quarter inch thus giving about one-eighth inch clearance above and below plate 178. Spring 156 will be chosen to allow a stroke of about one-half inch so that the maximum clearance between surfaces 162 and 164 will be about one inch.

It will be appreciated that in the absence of the automatic nozzle adjustment provided by spring 156 and the sliding engagement of deflector plate 150 with support rod 142, a substantial increase in fluid supply pressure would cause the spray pattern to be extended radially outward to an undue extent and would tend to create a void in the center of the pattern. Conversely, a decrease in flow supply pressure would cause the spray pattern to be reduced radially inward and would tend to create a void in the outer perimeter of the spray pattern. By appropriate choice of the spring rate of spring 156, the nozzle 120 will automatically adjust the cross-sectional area of annular nozzle opening 166 so as to maintain a substantially uniform spray pattern over a wide range of fluid supply pressures and flow rates.

In a preferred embodiment, the upper surface 128 of upper fill layer 121 has dimensions of about eight feet by eight feet and thus has a plan area of about sixty-four square feet which is uniformly covered by the one and only one nozzle 120.

In operation of the cooling tower module 110, the nozzle 120 sprays a liquid to be cooled, generally water, out over the upper surface 128 of upper fill layer 121. That liquid then percolates downward through the layers of fill material and falls out of the bottom layer 115 onto the collection plates 90 through 106 which collect the water and drain it into the basin 32. Water flows out the outlet 76 of basin 32.

Figure 7:
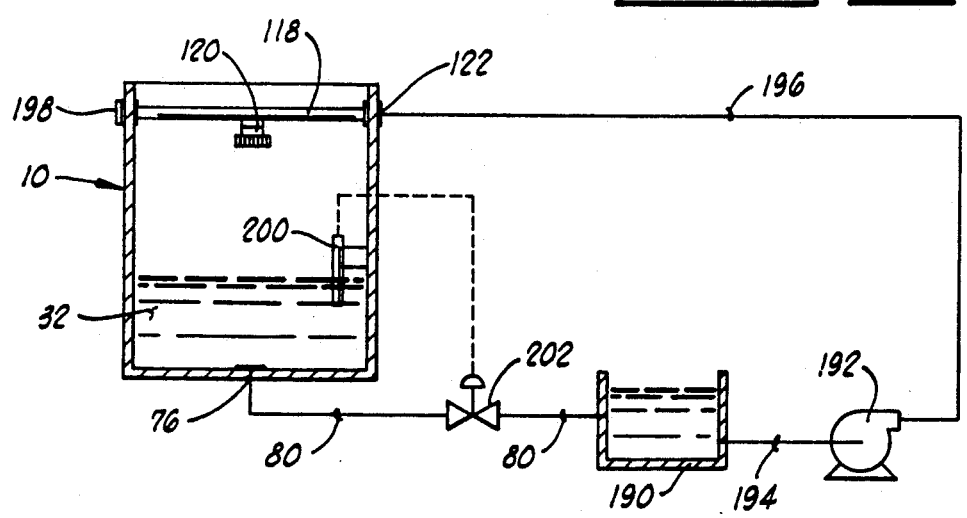
FIG. 7 is a schematic illustration of the plumbing to the modular cooling towers schematically illustrating a liquid level control system and a makeup water sump utilized with a circulation pump.

FIG. 7 schematically illustrates one piping system which may be utilized to control the flow of water through tower 10. The basin discharge piping 80 is connected to drain outlet 76 of basin 32 and carries the water to a makeup sump 190. A circulating pump 192 has a suction line 194 which draws water from sump 190. Pump 192 pumps the water through high pressure water discharge piping 196 which is connected to the flanged end 122 of supply pipe 118. A blind flange 198 covers the opposite end of pipe 118.

A liquid level controller 200 is disposed in sump 32 to monitor the level of water therein in order to maintain the water level within the overlapping portions of fan inlet duct 24 and fan shroud 34 so that the water level lies within gap 36. Level controller 200 is connected to a flow control valve 202 disposed in basin discharge piping 80 to control the flow rate of water therefrom.

The purpose of maintaining the water level within the overlapping region of fan inlet duct 24 and fan shroud 34 within the gap 36 is to prevent the fan from drawing air up through the gap 36 which would tend to entrain an unnecessary amount of water into the air being blown upward by the fan and also would degrade the operating efficiency of the fan.

The plumbing of the pumping system associated with cooling tower 10 can also be constructed in other ways than that shown in FIG. 7. For example, the discharge piping 80 can be connected directly to the suction inlet of a horizontal pump 192 and the sump 190 and level controller 200, 202 may be eliminated.

As seen in FIG. 3, the water which falls down through the fill material will normally strike the upper side of one of the collection plates 90 through 106. It will be appreciated, however, that due to the very humid environment within the cooling tower 10, there will be a substantial amount of condensation which will occur on the under side of the collection plates 90 through 106. Additionally, there will be overspray or splash which will occur from water falling on the upper side of various ones of the plates. This condensation and overspray or splash has been a significant problem with drainage collection systems of the prior art. The cooling tower 10, however, provides a very efficient means for collecting this condensate and overspray or splash liquid.

The fans 38, 40, 42 and 44 blow a very strong air stream directly upward against the under side of the collection plates 90 through 106 so that all of this condensate or overspray will be blown against the under side of those plates. The condensate and overspray will run in a film along the under side of the plates until it drips off either directly into the basin 32 or onto the flared upper portions of the fan shrouds such as 34. Any liquid which tends to drip off directly above the fans will of course be blown upward against the under side of the collection plates by the very strong blast of air coming up from the fans or if it reaches the fan blades will be slung radially out against fan shroud 34.

Any liquid that falls upon the upper surface of the fan shrouds will then run downward in a film along the upper surface of the fan shrouds down into the annular gap 36 between each fan shroud and its associated air inlet duct. Thus, the gap 36 between each of the fan shrouds and its associated air inlet duct provides a secondary collection system for receiving liquid runoff from the under side of the collection plates 90 through 106.

Additionally, the fans provide turbulent contact of the air with the fill material thus improving efficiency as compared to prior art systems which have a more laminar flow of air into the fill material layers.

The use of a blind flange 198 on one end of the pipe 118 provides a means for flushing the liquid supply pipe 118. All that need be done to flush the piping system is to remove the blind flange 198 and provide high pressure water through high pressure piping 196 so that any scale or the like collected within the pipe 118 will be blown out the open end where blind flange 198 originally was located.

The module 10 just described, having drainage collection system 82 below the fill media, and having the fans below the drainage collection system is the preferred manner of constructing a direct forced draft counter flow water cooling tower module. By placing the drainage collection system above the fans, the fans are protected from the water circulating through the tower. Thus, the fans 38, 40, 42 and 44 do not have to be of a waterproof construction, although they can be.

An alternative manner of constructing a direct forced draft counterflow water cooling tower module would be to eliminate the drainage collection system 82 and to place waterproof fans immediately under the fill media with a catch basin under the fans. The fans would have to operate in a water-drenched environment. Air inlets would be provided through the side walls of the frame at an elevation below the fans and above the catch basin. Such an alternative system is encompassed within the broadest aspects of the present invention.

MODULAR COOLING TOWER CONSTRUCTION

The cooling tower 10 is capable of independent operation as previously described, but also it is capable of operation in association with other substantially identical modules to form modular construction water cooling towers. The great advantage of such modular construction cooling towers is that each of the individual modules 10 can be prefabricated in a factory environment and then transported to a field site where they are to be connected together to form a modular construction cooling tower. An example of a modular construction cooling tower erected on field site is shown in FIG. 6.

Figure 6:
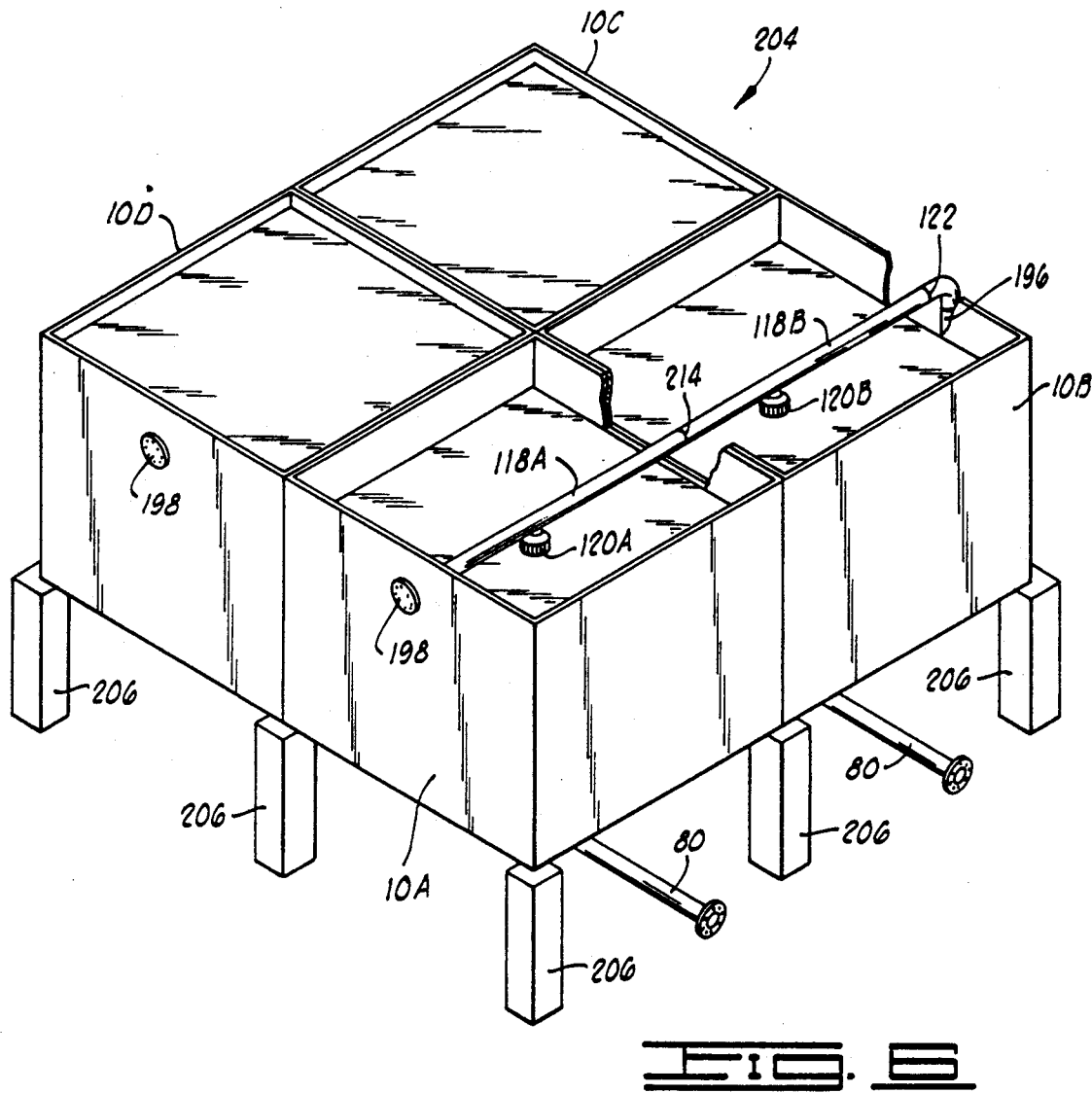
FIG. 6 is a perspective view of a modular cooling tower including four of the modules of FIG. 1 which have been structurally connected together and which have their liquid supply systems connected together and have their basin drainage systems connected together.

FIG. 6 illustrates a modular construction cooling tower generally designated by the numeral 204 made up of four of the modules 10 which for convenience are designated as 10A, 10B, 10C and 10D. The four modules 10A–10D are arranged in a rectangular plan shape with each module occupying one quadrant of said rectangular plan shape. It will be appreciated that any desired number of the modules 10 can be utilized to provide the total cooling capacity necessary. Further, the modules can be arranged in any appropriate manner so as to fit within the available ground space. For example, the modules can be arranged in a square pattern as shown in FIG. 6, they can be arranged in an in-line pattern as shown in FIG. 8, or they could be arranged in a rectangular pattern, for example two modules wide by four modules long. Furthermore, a pattern having more than two modules in width can be arranged. For example, a nine-module tower could be arranged having three modules along each side so as to form a square tower.

Returning to the specific example shown in FIG. 6, the field site has been previously prepared by constructing nine concrete columns 206 to be located at the corners of the respective modules.

The modules 10 are preferably prefabricated to have a width 208 (see FIG. 4) of approximately eight and one-half feet, a length 210 of approximately eight and one-half feet, and a height 212 (see FIG. 2) of less than eleven feet, and preferably of approximately ten feet, four inches. Thus, the individual modules 10 can be readily transported on flat bed trailer trucks without the need for overwidth or overheight hauling permits.

Although larger modules could be constructed, for example a twelve-foot-wide by twelve-foot-long module, the eight and one-half by eight and one-half dimensions just described are preferred because of the ease of transport thereof.

It will be appreciated that the modules 10 can be completely prefabricated at the factory location, or they may only be partially prefabricated. For example, in many cases it will be desirable to await placement of the fill material and/or drift eliminators until after the module is located at the field site and the various modules have been connected together.

The modules are carried to the field site and set upon the piers 206 as illustrated in FIG. 6. The module frames 12 can be provided with bolt tabs (not shown) for bolting thereof to the piers 206. The modules will be arranged in rows such as the row made up of modules 10A and 10B with their supply pipes 118A and 118B aligned and with the adjacent flanged ends thereof bolted together as indicated schematically at 214 in FIG. 6. The bolting together of the flanged ends of the liquid supply pipes 118A and 118B serves two purposes. First, it connects the fluid distribution systems of modules 10A and 10B thus providing a common liquid supply system. Further, it structurally connects the frames of modules 10A and 10B.

The modules 10D and 10C form a second row which will similarly have their liquid supply pipes bolted together. Further, the modules of adjacent rows (e.g., modules 10A and 10D) may be structurally connected simply by the fact that they are supported on a common supporting structure such as piers 206, or they may be bolted together by bolts set through the walls of the modules.

The piers 206 hold the bottom of the modules 10 at a desired distance above the ground surface to provide room for the free flow of air under the modules 10. Also, the discharge piping 80 will extend under the modules 10.

With the modular cooling tower construction 204 of FIG. 6, it is apparent that the only major load-bearing structures are the simple concrete piers 206. Each module 10 need only transfer the weight of the water and mechanical equipment contained therein to the piers located at its corners. Thus the individual modules are structurally very simple and cheap to build as compared to traditional cooling towers having much larger frame structures which are required to support heavy mechanical equipment located high up in the structure and to support much heavier water loads than do any one of the modules 10.

FIG. 8 illustrates another arrangement of separate cooling tower modules which have been formed together to provide a modular cooling tower. The modular cooling tower of FIG. 8 is a portable modular cooling tower and is designated generally by the numeral 216. The individual modules of portable cooling tower 216 have been designated for convenience as 10E, 10F, and 10G. The modules 10E, 10F and 10G are mounted upon a wheel transport frame 218. The modules 1OE, 1OF and 1OG are arranged in a row with their liquid supply pipes 118E, 118F and 118G bolted together to form a common liquid supply system. The liquid supply system has a blind flange 198 at its forward end and has an open end 220 for connection of high pressure liquid supply piping from a pump such as pump 192 of FIG. 7. The liquid drains from the sumps of modules 1OE, 10F and 10G are plumbed together with a common discharge piping 222.

Individual or multiple units 10 could also be skid mounted for portable use.

In any of the modular construction cooling towers such as that of FIG. 6 or FIG. 8, it is generally desirable to connect the basins 32 of each module so that there will be a uniform water level throughout all of the basins. This is readily accomplished simply by cutting superimposed openings (not shown) through the side walls of adjacent modules and drilling a pattern of bolt holes around the openings. A gasket is sandwiched between the adjacent openings and held therein by the bolts which are then placed through the walls of the modules. Since the module frames 12 are constructed of fiberglass material, these openings can be easily created where desired by simply cutting circular openings through the side walls and drilling the bolt holes as described.

ADVANTAGES AS COMPARED TO TRADITIONAL INDUCED DRAFT COUNTERFLOW INDUSTRIAL COOLING TOWERS

The direct forced draft counterflow water cooling tower module 10 of the present invention provides many advantages as compared to induced draft counterflow water cooling towers which are now most commonly used in the industry.

First, there is a major advantage in reduced initial construction costs of the modular units which can be prefabricated as compared to typical site built induced draft counterflow cooling towers. The traditional induced draft counterflow water cooling towers are typically from twenty to thirty feet high and they involve a very large and expensive structural skeleton for supporting the heavy fans located thereabove. Such structures require stairways, ladders, safety cages and the like as are now commonly associated with large physical structures of that type due to prevailing safety regulations. All of this is eliminated by use of the modules 10 which have the simple fiberglass one-piece cast outer frames 12 which are simply set upon piers such as the piers 206 in FIG. 6. It is estimated that the initial manufacturing cost of a modular cooling tower utilizing the present invention is reduced on the order of twenty percent or more as compared to traditional site built induced draft counterflow cooling towers of equivalent capacity.

In addition to the reduced cost, a much improved quality of cooling tower is provided because of the quality controls which are manageable in a factory environment as compared to the lack of quality control present in individual custom built field directed cooling towers.

There is also a substantial improvement in the delivery times available for a modular construction cooling tower as compared to a site built cooling tower. Typical site built induced draft cooling towers take approximately one year to construct after the letting of the contract. The cooling tower of the present invention can be assembled from prefabricated modules stocked in a warehouse, and the delay from letting of contract to the assembly and start-up of a cooling tower can be reduced to a matter of a month or two or even a few weeks if necessary.

There are many safety factors present in the construction of a modular cooling tower as contrasted to conventional site built cooling towers. The construction of a typical site built induced draft cooling tower first requires the erection of massive scaffolding with attendant safety equipment for use by workers as they construct the tower. With the present invention, the modules 10 are simply lifted in place by a crane or the like and bolted together. Thus, the dangers of construction are substantially eliminated.

The modular construction as shown in FIG. 6 further eliminates the need for field construction of a large concrete catch basins as are now required for induced draft cooling towers. Instead, only the simple piers 206 need be constructed. The area under the modular cooling tower 204 is available for other uses such as the parking of vehicles, storage of materials or the like.

The ability to use small direct drive fans eliminates the mechanical problems typically involved with large cooling towers which traditionally use very large fans having gear boxes between the motors and fan drives. Mechanical maintenance for the customer is greatly reduced in that they can simply stock a few replacement fans and upon encountering mechanical difficulties, the problematic fan unit can be removed and replaced, with the damaged fan unit then being taken to a shop for repair. This can be accomplished with minimal if any down time of the cooling tower itself.

Further, accessibility to the fan units is very easy since the piers 206 will typically have a height of from four to twelve feet which allows the fan units to be accessed from below.

Another efficiency as compared to an induced draft cooling tower is that the fan units of the modules 10 cause a very turbulent impacting of the air which flows upward in the fill material thus causing a better distribution of the air and better cooling as the air turbulently impacts water flowing down through the fill material. This is contrasted to induced draft cooling towers where the air flows in in a rather laminar fashion.

Another related advantage is that with an induced draft cooling tower, the air which is induced to flow laterally inward under the tower tends to move toward the center of the fill material and tends to create a void around the perimeter of the cooling tower. This is due in part to the difficulty that the air encounters in making a ninety degree turn from lateral motion to upward motion. Further, the fans of the induced draft cooling tower are above the center of the towers and thus all of the air flow tends to funnel toward the center of the fill media. With the modules 10, however, the fans provide a very vigorous blast of air against the under side of the lower fill layer 115 and in effect create a pressurized plenum immediately below the lower fill area 115 so that relatively uniform areal dispersal of the upwardly flowing air is provided. This also increases "fill efficiency", i.e., it increases the effective use of all of the fill material for cooling.

Another related advantage as compared to an induced draft cooling tower is that induced draft cooling towers have a layer of wall water which runs down the outer walls and trickles in a sheet-like fashion below the perimeter of the walls as it falls down into the catch basin. The incoming air must flow through this trickling sheet of wall water, and thus the wall water provides an impediment to free incoming flow of air. The modules 10 through the use of the drainage collection system 82 located above the fans eliminate the problem of wall water since the air which flows inward to the fan inlet ducts need not flow across a wall of downwardly flowing water.

Another advantage is that fan efficiency in general is greatly improved when using a fan in a forced draft mode rather than in an induced draft mode. Further, having the fan very close to the fill material reduces frictional flow pressure losses of the air again improving fan efficiency. Further, the fact that the fans cause a turbulent flow in immediate contact with the fill media further improves the efficient use of the fill.

Another advantage provided through the use of a drainage collection system as contrasted to a ground level catch basin as used with induced draft towers, is that a much lower pump head for the pump 192 is required to return the water to the liquid distribution system. The pump 192 need effectively only provide a pump head equal to the differential between the elevation of the upper level of liquid within sump 32 and the elevation of distribution pipe 118. Conventional induced draft cooling towers, on the other hand, must provide a pump head from the ground level at which their catch basin is located all the way up to the uppermost extent of the tower where the water distribution system is located, typically a height on the order of twenty feet or more. The pump head which must be provided by pump 192 with the previously described eight and one-half by eight and one-half by ten-foot, four-inch module of the present invention is on the order of seven to eight feet. Thus a greatly reduced pumping capacity is necessary providing very substantial economic savings for the operator of the cooling tower as compared to conventional induced draft cooling towers.

Another advantage of the cooling tower modules 10 is the ease with which they can be placed in difficult locations. For example, the modules 10 will be ideal for use as rooftop cooling towers placed on the top of large office buildings and the like. The cooling tower 10 can be simply lifted into place with a crane and set onto a simple support structure. That is contrasted to the great difficulty of site construction of induced draft cooling towers on such building top locations, particularly in a heavily populated downtown office environment.

Another advantage is that due to the increased fan efficiencies provided through the use of a forced draft system, the fan horsepower requirements are reduced by as much as twenty to thirty percent as compared to an induced draft cooling tower of equal capacity. This also provides very substantial operating efficiencies to the operator of the modular cooling tower which efficiencies can in fact pay for the cost of the cooling tower over a few years.

Thus it is seen that the apparatus of the present invention readily achieves the ends and advantages mentioned as well as those inherent therein. While certain preferred embodiments of the invention have been illustrated and described for purposes of the present disclosure, numerous changes may be made by those skilled in the art which changes are encompassed within the scope and spirit of the present invention as defined by the appended claims.

What is claimed is:

1. A transportable cooling tower module, comprising:
   a basin;
   four walls extending vertically upward from said basin;
   an air supply duct having an air intake opening defined in a bottom thereof and an air discharge outlet defined in a top thereof, said air supply duct extending vertically through said basin so that said basin laterally surrounds said air supply duct;
   a vertical axis fan located in said air supply duct;
   a drainage collection system located above said basin and said air supply duct, said drainage collection system including a plurality of parallel elongated collection plates having a length, said collection plates being sloped and overlapping in a direction transverse to said length of said collection plates, each collection plate having a lower gutter portion arranged to drain into said basin, said overlapping collection plates covering said fan;
   a body of fill material located directly above said drainage collection system, said body of fill material having a vertical thickness of at least approximately four feet;
   a liquid distribution system including at least one horizontal pipe supported from opposed ones of said side walls and including at least one nozzle spaced above said body of fill material so as to have a free fall height of spray from said nozzle to said fill material of less than one foot;
   a drift eliminator located above said horizontal pipe of said liquid distribution system; and
   said transportable cooling tower module having an overall height from a bottom of said basin to a top of said walls of less than eleven feet.

2. The transportable cooling tower module of claim 1, wherein:
   said drift eliminate is supported at least in part directly on said horizontal pipe of said liquid distribution system.

3. The transportable cooling tower module of claim 1, wherein:
   said collection plates each have an uppermost supporting surface; and
   said body of fill material is supported directly on said uppermost supporting surfaces of said collection plates.

4. The transportable cooling tower module of claim 1 further comprising:

three additional air supply ducts, making a total of four air supply ducts extending vertically through said basin, said basin laterally surrounding each of said four air supply ducts; and three additional vertical axis fans, one of which is located in each of said three additional air supply duct.

5. The transportable cooling tower module of claim 1, wherein:
said fan is a direct drive electrically powered fan.

6. The transportable cooling tower module of claim 1, wherein:
said body of fill material includes at least four layers of corrugated plastic fill material, each layer being approximately one foot thick.

7. The transportable cooling tower module of claim 1, wherein:
said overall height of said module is no greater than ten feet, four inches.

8. The transportable cooling tower module of claim 1, wherein:
said nozzle includes a rotating plate having a plurality of blades thereon for distributing liquid from said liquid distribution system over said body of fill material.

9. The transportable cooling tower module of claim 1, wherein:
said basin and said walls form an integrally constructed fiber reinforced plastic structure.

10. The transportable cooling tower module of claim 1, wherein:
said horizontal pipe includes flanged ends substantially flush with said opposed ones of said side walls, said horizontal pipe and said opposed ones of said side walls forming an integrally constructed fiber reinforced plastic structure.

11. The transportable cooling tower module of claim 10, in combination with a second such module, said modules being joined together structurally and for common fluid supply to their liquid distribution systems, by bolting together of one of said flanged ends of said horizontal pipe of said first module to one of said flanged ends of said horizontal pipe of said second module.

12. The transportable cooling tower module of claim 1, in combination with three other such modules, said four modules being arranged in a rectangular plan shape with each module occupying one quadrant of said rectangular plan shape.

13. A modular construction water cooling tower, including said module of claim 1 and at least one other substantially identical module, said modules being connected together structurally and having a common liquid supply system, each of said modules being capable of independent operation when separated from each other.

14. The modular construction water cooling tower of claim 13, wherein each of said modules is a prefabricated module which can be separately transported to a construction site for assembly into said modular construction water cooling tower.

15. The modular construction cooling tower of claim 13, wherein said modules are aligned in a row and are mounted upon a wheeled transport to provide a portable cooling tower.

16. The transportable cooling tower module of claim 1, wherein:
each of said four walls has a width of approximately eight and one-half feet.

17. The transportable cooling tower module of claim 1, wherein:
each of said four walls has a width of approximately twelve feet.

18. A cooling tower, comprising:
at least one layer of fill material;
a liquid distribution system for distributing liquid onto said fill material;
a drainage collection system located under said fill material;
at least one fan located under said drainage collection system to force air directly upward from said fan through said drainage collection system and through said fill material;
a frame supporting said liquid distribution system, said fill material, said drainage collection system and said fan;
a basin supported by said frame and located below said drainage collection system to receive liquid run-off from said drainage collection system;
an air supply duct having an air intake opening defined in a bottom of said tower and having an air discharge opening directed upward toward said drainage collection system;
said fan being located within said air supply duct;
said basin laterally surrounding said air supply duct;
wherein said drainage collection system has an underside against which air is directly blown by said fan;
wherein said air supply duct include a secondary liquid collection means for directing condensate and spray collecting on said underside of said drainage collection system into said basin; and
wherein said air supply duct includes a lower cylindrical duct portion telescopingly received within an upper cylindrical duct portion with an annular gap between overlapping portions of said lower and upper cylindrical duct portions, said annular gap being communicated with said basin and being part of said secondary liquid collection means.

19. The cooling tower of claim 18, further comprising:
liquid level control means for maintaining a liquid level in said basin within said annular gap.

* * * * *